United States Patent [19]

Kondo et al.

[11] Patent Number: 4,700,817
[45] Date of Patent: Oct. 20, 1987

[54] DYNAMIC VIBRATION ABSORBER WITH SPRING-SUPPORTED PENDULUM

[75] Inventors: Kiyoshi Kondo; Fukuhiko Kataoka, both of Tsu; Kiyotaka Uno, Hisai, all of Japan

[73] Assignee: Nippon Kokan Kabushiki Kaisha, Tokyo, Japan

[21] Appl. No.: 874,486

[22] Filed: Jun. 16, 1986

[30] Foreign Application Priority Data

Jun. 27, 1985 [JP]  Japan ................................. 60-141190
Jun. 27, 1985 [JP]  Japan ................................. 60-141191
Jun. 27, 1985 [JP]  Japan ................................. 60-141193

[51] Int. Cl.$^4$ .......................... F16F 7/10; F16F 1/00; F16M 1/00
[52] U.S. Cl. .................................. 188/380; 267/136; 267/150
[58] Field of Search ............... 188/378, 379, 380, 266; 267/136, 150, 158, 160, 164; 74/592, 604; 73/836, 862.38; 40/485; 60/497, 499; 248/560, 566

[56] References Cited

U.S. PATENT DOCUMENTS

| | | | |
|---|---|---|---|
| 2,182,712 | 12/1939 | Vogel | 267/160 X |
| 3,155,855 | 11/1964 | Futterer | 267/150 X |
| 3,172,502 | 3/1965 | Wells | 188/378 |
| 4,575,203 | 3/1986 | Brandt et al. | 188/380 |

FOREIGN PATENT DOCUMENTS 0014438  2/1905  Norway ................................. 40/485

Primary Examiner—Andres Kashnikow
Assistant Examiner—Robert J. Oberleitner
Attorney, Agent, or Firm—Frishauf, Holtz, Goodman & Woodward

[57] ABSTRACT

A weight is swingably suspended from the central portion of a top plate of a frame by means of a weight suspension shaft. First ends of a pair of U-shaped leaf springs are attached to a portion of the shaft adjacent to a pivotal point thereon so as to be symmetrical with respect to the shaft. The other or second ends of the springs are attached to the inner wall surface of the frame at positions below the first ends.

6 Claims, 6 Drawing Figures

F I G. 1
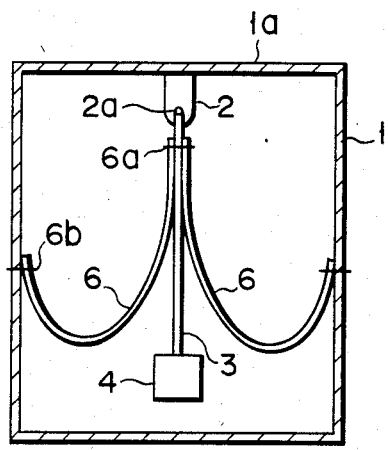
F I G. 2
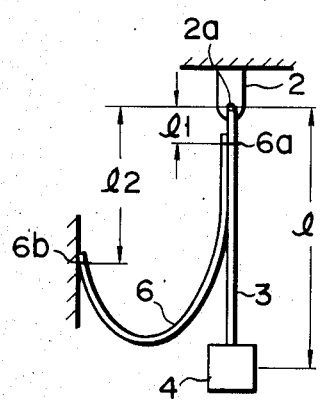
F I G. 3
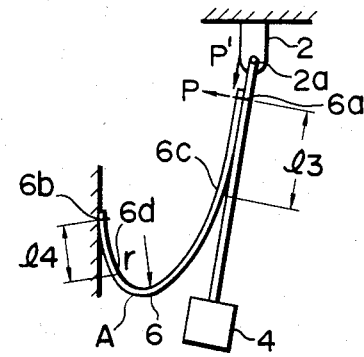

– 1 –

DYNAMIC VIBRATION ABSORBER WITH SPRING-SUPPORTED PENDULUM

BACKGROUND OF THE INVENTION

The present invention relates to a dynamic vibration absorber with a spring-supported pendulum.

In dynamic vibration absorbers with a spring-supported pendulum, the amplitude of oscillation of a pendulum is generally great enough to absorb great energy, requiring some special requirements for the springs used. For example, the stress on the springs must be made small lest the springs become fatigued after prolonged use. Also, the springs must have a spring constant at a certain level. Conventionally, however, there have been no dynamic vibration absorbers that meet these requirements.

SUMMARY OF THE INVENTION

The object of the present invention is to provide a dynamic vibration absorber with a spring-supported pendulum improved in spring durability.

In a dynamic vibration absorber according to the present invention, a weight is swingably suspended from the central portion of a top plate of a frame by means of a weight suspension shaft. First ends of a pair of U-shaped leaf springs are attached to a portion of the shaft adjacent to a pivotal point thereon so as to be symmetrical with respect to the shaft. The other or second ends of the springs are fixed to the inner wall surface of the frame at positions below the first ends.

BRIEF DESCRIPTION OF THE DRAWINGS

FIG. 1 is a front view of an embodiment of the present invention showing a frame in vertical section;

FIG. 2 is a schematic view for illustrating an arrangement of a leaf spring;

FIG. 3 is a schematic view showing a weight in a deflected position;

DETAILED DESCRIPTION OF THE PREFERRED EMBODIMENTS

Figure 4:
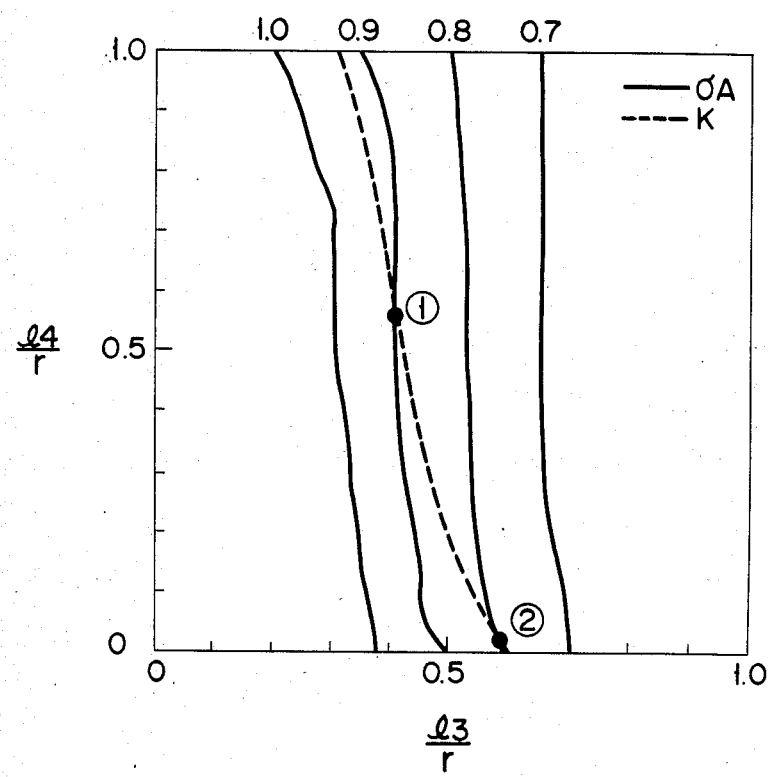
FIG. 4 is a diagram showing the relationships between l3/r, l4/r, stress on the leaf spring, and spring constant.

Referring now to FIGS. 1 to 3, one embodiment of the present invention will be described. Bracket 2 is suspended from the central portion of top plate 1a of cylindrical frame 1. Weight suspension shaft 3, having weight on its lower end portion, is swingably attached to bracket 2. A pair of leaf springs 6, U-shaped in vertical section, are provided symmetrically with respect to shaft 3. One end of each spring 6 is attached to shaft 3, while the other end is fixed to the inner wall surface of frame 1. Attachment point 6a on shaft 3 is adjacent to pivotal point 2a, and fixing point 6b on the inner wall surface of frame 1 is located below point 6a. Thus, distance l2 from point 2a to point 6b is greater than distance l1 from point 2a to point 6a.

With this arrangement, even if weight 4 swings wide, displacement of leaf springs 6 can be small because distance l1 between points 6a and 2a is short. Thus, stress on the springs can be made small. As weight 4 swings, driving force P acts on each spring 6 at attachment point 6a. As spring 6 is deformed in this manner, a force directed toward suspension shaft 3 acts at point 6a, and reaction force P' acts on the spring.

Bending moment MA acting on leaf spring 6 at bending point A and stress $\sigma A$ are $MA = P(l3+r) - P'r$ and $\sigma A = MA \cdot t/2/I$, where r is the radius of curvature at bending point A of leaf spring 6, l3 is the length of the straight portion of the spring on the suspension shaft side, i.e., the distance between points 6a and 6c, l4 is the length of the straight portion of the spring on the frame wall side, i.e., the distance between points 6b and 6d, and t is the thickness of the spring. In FIG. 4, axes of abscissa and ordinate represent l3/r and l4/r, respectively. Also, full lines indicate points where stress $\sigma A$ is uniform, while a broken line is indicative of points for fixed spring constant k. Stress $\sigma A$ is smaller at intersecting point (2) than at point (1), although spring constant k is not subject to variation. This indicates that where the spring constant of the U-shaped leaf spring is fixed, the stress on the spring can be further reduced if l3 and l4 are made longer and shorter, respectively, or if there is a relation l1 < l2.

If the spring constant required when the spring attachment point is on weight 4, or when the distance between 2a and 6a is l, is keq, then spring constant k for distance l1 must be $k = keq(l/l1)^2$. This requirement can be fulfilled by increasing the width of leaf spring 6.

The frequency of proper vibration of the dynamic vibration absorber can be controlled by suitably adjusting distance l from pivotal point 2a to weight 4 which is mounted on suspension shaft 3 for vertical movement. The stress on leaf spring 6 can be relieved by supporting the spring at attachment point 6a by means of a pin.

Thus, in the dynamic vibration absorber according to the present invention, the spring constant is fixed at a desired value, and the stress on the springs can be reduced for higher durability of the springs.

Figure 5:
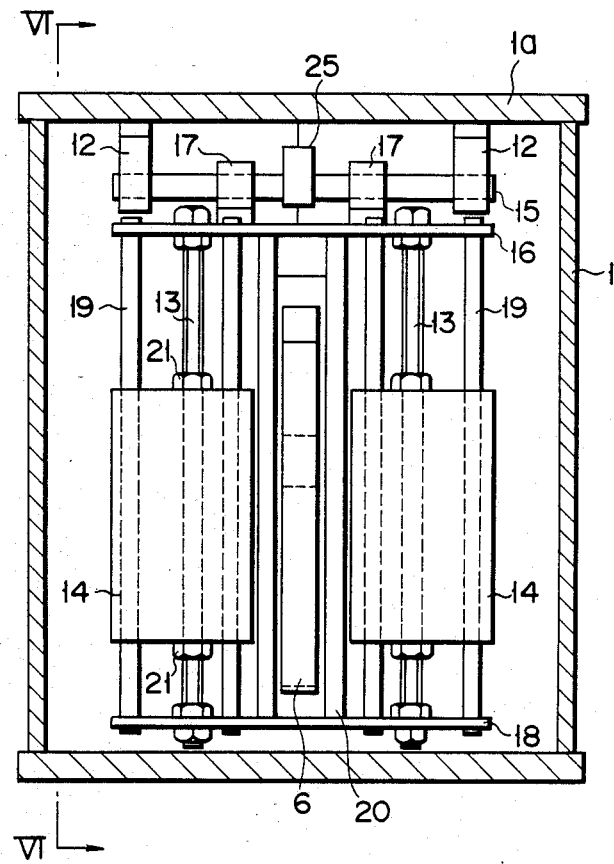
FIG. 5 is a side view of another embodiment of the invention showing a frame in vertical section.
Figure 6:
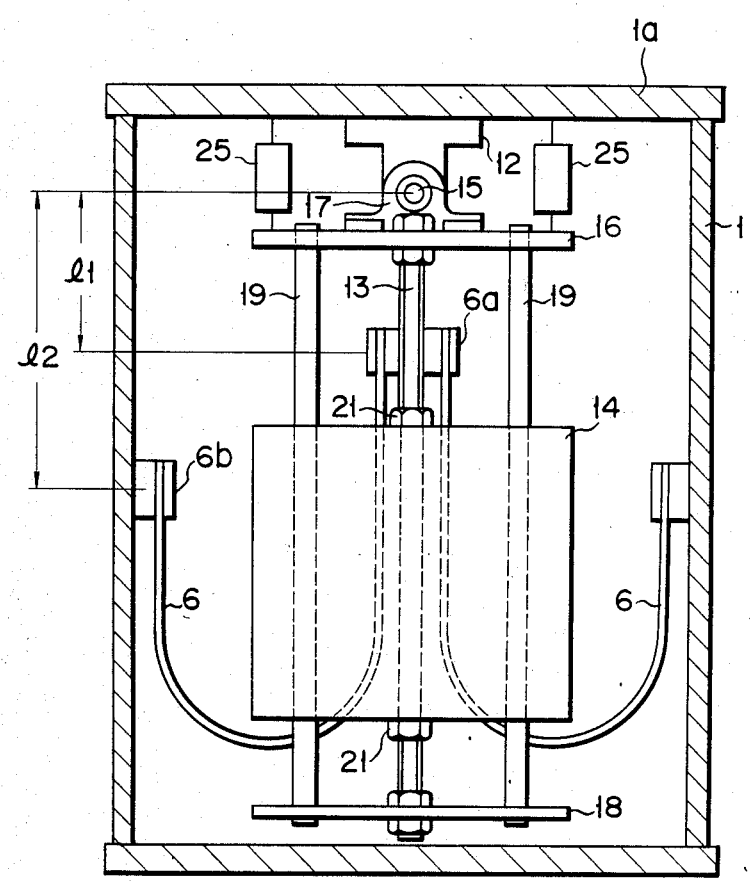
FIG. 6 is a front view as taken along line VI—VI of FIG. 5.

Referring now to FIGS. 5 and 6, another embodiment of the invention will be described. A pair of bearings 12 for shaft 15 are arranged on the centerline of top plate 1a of cylindrical frame 1. A pair of pillow blocks 17 on rectangular upper seat plate 16 are fitted on shaft 15 so that plate 16 can swing around shaft 15. Upper and lower seat plates 16 and 18 are coupled by means of a plurality of guide rods 19 which guide a pair of weights 14 in vertical motion. Spring anchor plate 20 is disposed between plates 16 and 18, and a pair of screw rods 13 for the vertical motion of weights 14 are arranged with plate 20 between them. The vertical position of weights 14 can be adjusted by loosening upper and lower nuts 21 screwed on each rod 13, vertically sliding the weights along guide rods 19, and then tightening the nuts. A pair of leaf springs 6, U-shaped in vertical section, are provided symmetrically with respect to anchor plate 20. One end of each spring 6 is attached to plate 20, while the other end is fixed to the inner wall surface of frame 1. Attachment point 6a on plate 20 is adjacent to shaft 15, and fixing points 6b on the inner wall surface of frame 1 are located below point 6a. Thus, distance l2 from shaft 15 to point 6b is greater than distance l1 from shaft 15 to point 6a.

With this arrangement, the frequency of proper vibration of the dynamic vibration absorber can be varied by vertically moving weights 14 to change distance l from shaft 15 to the center of gravity of each weight 14. Even though the total weight mass is made great to provide a mass ratio high enough to correspond to the fluctuation of the angular frequency of exciting force, two weights 14 can be easily adjusted for location due to their halved mass.

As in the case of the first embodiment, even if weights 14 swing wide, the stress on the springs can be reduced for higher durability of the springs.

A pair of dampers 25 are interposed between upper seat plate 16 and top plate 1a so as to be symmetrical with respect to shaft 15. The dampers may be formed of oil dampers or air dampers. They can be mounted easily since they are located between top plate 1a and seat plate 16 which rocks together with weights 14. An optimum damping effect of the dynamic vibration absorber can be obtained by adjusting the damping coefficient of the dampers.

What is claimed is:

1. A dynamic vibration absorber with a spring-supported pendulum, comprising:
    a weight suspension shaft swingably suspended from a central portion of a top plate of a frame;
    a weight attached to the weight suspension shaft;
    a pair of generally U-shaped leaf springs, said leaf springs having first ends which are attached to the weight suspension shaft so as to be symmetrical with respect to the weight suspension shaft, said first ends being attached to the weight suspension shaft in the vicinity of a pivotal point on the weight suspension shaft, and said leaf springs having second ends which are attached to an inner wall surface of the frame at positions below the first ends; and
    said weight being adjustably attached to the weight suspension shaft so as to be adjustable in vertical position on said weight suspension shaft.

2. The dynamic vibration absorber according to claim 1, wherein said weight suspension shaft is pivotally connected to said central portion of said top plate at said pivotal point.

3. A dynamic vibration absorber with a spring-supported pendulum, comprising:
    a pair of weight suspension shafts hung from an upper seat plate swingably suspended from a central portion of a top plate of a frame;
    a pair of weights each adjustably attached to a respective weight suspension shaft so as to be adjustable in vertical position on its respective suspension shaft;
    a spring anchor plate suspended from a central portion of said upper seat plate; and
    a pair of generally U-shaped leaf springs, said leaf springs having first ends which are attached to an upper end portion of said spring anchor plate so as to be symmetrical with respect to the spring anchor plate, said leaf springs having second ends which are attached to an inner wall surface of the frame at positions below the first ends thereof.

4. The dynamic vibration absorber according to claim 3, further comprising:
    a lower seat plate opposed to the upper seat plate;
    the weight suspension shafts each having a screw thread therein;
    weight guide rods disposed between the two upper and lower seat plates; and
    a weight position adjustment nut screwed on the screw thread of each of the weight suspension shafts.

5. The dynamic vibration absorber according to claim 3, further comprising dampers arranged between the upper seat plate and the frame top plate.

6. The dynamic vibration absorber according to claim 3, wherein said upper seat plate is pivotally connected to said central portion of said top plate, said first ends of said U-shaped leaf springs being connected to said spring anchor plate in the vicinity of said pivotal connection.

* * * * *